(12) United States Patent
Amamori

(10) Patent No.: US 7,029,030 B2
(45) Date of Patent: Apr. 18, 2006

(54) OCCUPANT PROTECTION DEVICE

(75) Inventor: Ichiro Amamori, Hikone (JP)

(73) Assignee: Takata Corporation, Tokyo (JP)

( * ) Notice: Subject to any disclaimer, the term of this patent is extended or adjusted under 35 U.S.C. 154(b) by 98 days.

(21) Appl. No.: 10/435,553

(22) Filed: May 12, 2003

(65) Prior Publication Data

US 2003/0218319 A1 Nov. 27, 2003

(30) Foreign Application Priority Data

May 22, 2002 (JP) ............................. 2002-147961

(51) Int. Cl.
*B60R 21/22* (2006.01)
(52) U.S. Cl. ................... 280/730.1; 280/743.1
(58) Field of Classification Search ............ 280/728.1, 280/730.2, 732, 743.1, 730.1
See application file for complete search history.

(56) References Cited

U.S. PATENT DOCUMENTS

| | | | | |
|---|---|---|---|---|
| 3,897,961 A | * | 8/1975 | Leising et al. ........... | 280/730.1 |
| 5,470,103 A | * | 11/1995 | Vaillancourt et al. .... | 280/730.1 |
| 5,670,853 A | | 9/1997 | Bauer | |
| 6,224,088 B1 | * | 5/2001 | Lohavanijaya ........... | 280/728.2 |
| 6,328,334 B1 | * | 12/2001 | Kanuma ................... | 280/730.2 |
| 6,431,586 B1 | | 8/2002 | Eyrainer et al. | |
| 6,817,626 B1 | * | 11/2004 | Boll et al. ............... | 280/730.1 |

FOREIGN PATENT DOCUMENTS

| | | |
|---|---|---|
| DE | 299 16 526 U1 | 3/2000 |
| DE | 198 60 804 A1 | 7/2000 |
| DE | 198 60 827 A1 | 7/2000 |
| DE | 100 21 845 A1 | 11/2001 |
| JP | 61-159249 | 10/1986 |
| JP | 3-281458 | 12/1991 |
| JP | 4-91552 | 8/1992 |
| JP | 5-105021 | 4/1993 |
| JP | 5-229395 | 9/1993 |
| JP | 6-206510 | 7/1994 |
| JP | 6-344842 | 12/1994 |
| JP | 7-117605 | 5/1995 |
| JP | 7-164997 | 6/1995 |
| JP | 9-240406 | 9/1997 |
| JP | 9-328048 | 12/1997 |
| JP | 10-2647961 | 10/1998 |
| JP | 11-48894 | 2/1999 |
| JP | 11-342822 | 12/1999 |
| JP | 2000-168486 | 6/2000 |
| JP | 2000-185618 | 7/2000 |
| WO | WO96/09193 | 3/1996 |

* cited by examiner

*Primary Examiner*—Paul N. Dickson
*Assistant Examiner*—Toan C. To
(74) *Attorney, Agent, or Firm*—Manabu Kanesaka

(57) ABSTRACT

An occupant protection device includes an airbag to be deployed in front of a vehicle occupant and a gas generator for inflating the airbag. The airbag includes a thorax-protection airbag to be deployed in front of a thorax of the occupant and a head-protection airbag to be deployed in front of a head of the occupant. Since the occupant protection device includes the thorax-protection airbag and the head-protection airbag, the individual airbag has a small capacity and requires an inflator with an output lower than that in the conventional airbag device.

10 Claims, 3 Drawing Sheets

OCCUPANT PROTECTION DEVICE

BACKGROUND OF THE INVENTION AND RELATED ART STATEMENT

The present invention relates to an occupant protection device for protecting an occupant in a vehicle by inflating an airbag in front of the occupant during an accident.

An occupant protection device equipped in a vehicle for protecting an occupant by inflating an airbag in front of the occupant during an accident includes a driver seat airbag device mounted to a steering and a front passenger seat airbag device mounted to an instrument panel.

Japanese Patent Publications (Kokai) No. 06-344842, 07-117605, and No. 09-328048 have disclosed an airbag device in which an airbag is inflated from a roof of a vehicle downwardly.

The conventional driver-seat airbag device and front-passenger-seat airbag device have relatively high capacity so that an inflated airbag receives chest and head of the occupant. Therefore, a gas generator for inflating the airbag needs to have a high output.

Accordingly, it is an object of the present invention to provide an occupant protection device capable of inflating an airbag quickly by a gas generator with a low output.

Further objects and advantages of the invention will be apparent from the following description of the invention.

SUMMARY OF THE INVENTION

According to the present invention, an occupant protection device comprises an airbag to be deployed in front of a vehicle occupant and a gas generator for inflating the airbag. The airbag includes a thorax-protection airbag to be deployed in front of a thorax of the occupant and a head-protection airbag to be deployed in front of a head of the occupant.

Since the occupant protection device of the invention includes the thorax-protection airbag and the head-protection airbag, the individual airbag has a small capacity and requires an inflator with an output lower than that in the conventional airbag device. Furthermore, start timings of the inflation and inner pressures of the thorax-protection airbag and the head-protection airbag may be controlled individually.

It is preferable that the head-protection airbag is arranged at a roof of the vehicle. Since the roof of the vehicle has enough strength, it is possible to sufficiently receive a reaction force during the inflation of the airbag.

The head-protection airbag receives the head of the occupant having a weight smaller than that of the thorax. Thus, the head-protection airbag requires a capacity smaller than that of the thorax-protection airbag. Accordingly, the head-protection airbag can use a gas generator having a lower output.

According to an embodiment of the invention, the head-protection airbag is deployed along a windshield of the vehicle, and has a thickness of 25 to 200 mm when inflated.

Such an airbag having a relatively thin thickness has a low capacity, thus it is possible to deploy at an early stage even with a low output gas generator. Further, the thin airbag may be inflated over a wide range along the windshield, so that the head-protection airbag can receive the head of the occupant even when the occupant is in an abnormal position.

In this case, it is preferable that the head-protection airbag is arranged above a rearview mirror. Further, the head-protection airbag is formed of a unit having a right half bag to be deployed at the right side of the rearview mirror and a left half bag to be deployed at the left side of the rearview mirror. A space is provided between the right half and the left half so that the rearview mirror is situated in the space. With such an arrangement, the head-protection airbag with one gas generator can be deployed both in front of the driver seat and the front passenger seat.

In the present invention, it is preferable that sitting-height detecting means is provided for detecting a height of the occupant sitting on the seat. When the height detected by the sitting-height detecting means is higher than a predetermined value, both the head-protection airbag and the thorax-protection airbag are inflated. When the height is lower than a predetermined value, only the thorax-protection airbag is inflated. With such an arrangement, when a low height occupant such as a child sits on the seat, only the thorax-protection airbag receives the head and thorax of the occupant.

DETAILED DESCRIPTION OF PREFERRED EMBODIMENTS

Figure 1:
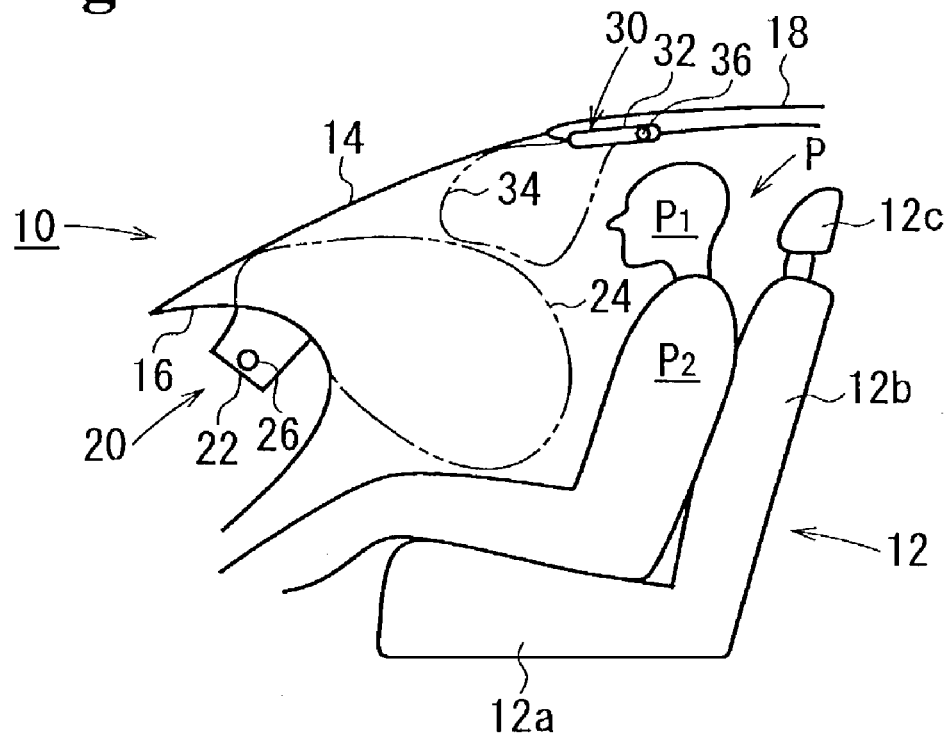
FIG. 1 is a longitudinal sectional view of a vehicle equipped with an occupant protection device according to the first embodiment of the present invention.

Hereunder, embodiments of the invention will be described with reference to the accompanying drawings. FIG. 1 is a longitudinal sectional view of a vehicle equipped with an occupant protection device according to the first embodiment.

The occupant protection device protects an occupant P on a front passenger seat 12 of a vehicle 10. Reference numeral 14 denotes a windshield of the vehicle 10, reference numeral 16 denotes an instrument panel, and reference numeral 18 denotes a roof. Reference numeral 12a denotes a seat cushion, reference numeral 12b denotes a seat back, and reference numeral 12c denotes a headrest.

In this embodiment, the instrument panel 16 is equipped with a thorax-protection airbag device 20, and the roof 18 is equipped with a head-protection airbag device 30. The airbag devices 20 and 30 include containers 22 and 32, airbags 24 and 34 housed in the containers 22 and 32 in an folded condition, gas generators (inflators) 26 and 36 for inflating the airbags 24 and 34, and lids (not shown) for covering the containers 22 and 32, respectively. In this case, the airbag 24 is a thorax-protection airbag and the airbag 34 is a head-protection airbag.

In this embodiment, the thorax-protection airbag device 20 is mounted on a top of the instrument panel 16, and the airbag 24 is inflated from the top of the instrument panel 16 toward the back of the vehicle.

The head-protection airbag device 30 is mounted at a front end of the roof 18, and the airbag 34 is inflated from the front end of the roof 18 downwardly. The head-protection airbag 34 contacts the windshield 14 when inflated.

The occupant P on the front passenger seat 12 is an adult with a normal sitting height. A head P1 of the occupant is positioned ahead of the headrest 12c, and a thorax P2 is positioned at an upper front of the seat back 12b. The thorax-protection airbag 24 is principally deployed in front of the thorax P2, and the head-protection airbag 34 is principally deployed in front of the head P1.

When the vehicle 10 comes into a collision, the respective gas generators 26 and 36 of the airbag devices 20 and 30 are activated to generate gas. The airbags 24 and 34 are deployed in front of the thorax P2 and the head P1, as indicated by hidden lines, to receive the thorax P2 and the head P1, respectively.

The conventional front passenger seat airbag has a capacity equal to a total capacity of the airbags 24 and 34 according to this embodiment. In the embodiment, the gas generators 26 and 36 individually inflate the airbags 24 and 34 having capacities sufficiently smaller than the conventional front-passenger-seat airbag. Accordingly, the airbags 24 and 34 can be inflated sufficiently early even with the gas generators 26 and 36 having the low outputs.

In the embodiment, the head-protection airbag 34 is inflated near the head of the occupant P1, as shown in the drawing. The head-protection airbag 34 receives the head P1 having a weight smaller than that of the thorax P2. Thus, the head-protection airbag 34 has a capacity lower than that of the thorax-protection airbag 24. Preferably, the head-protection airbag 34 has a capacity in the order of 15 to 60 litters, and the thorax-protection airbag 24 has a capacity in the order of 80 to 120 litters.

Figure 2:
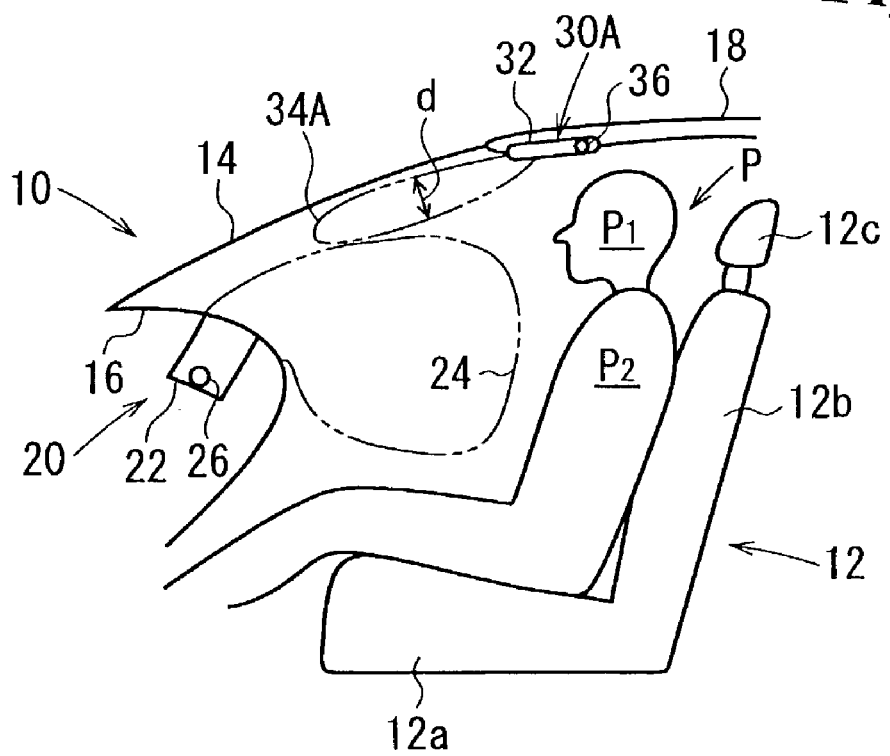
FIG. 2 is a longitudinal sectional view of a vehicle equipped with an occupant protection device according to the second embodiment of the present invention.

FIG. 2 is a longitudinal sectional view of a vehicle equipped with an occupant protection device according to the second embodiment. In this embodiment, a head-protection airbag device 30A includes a low-profile airbag as a head-protection airbag 34A having a thickness d of about 25 to 200 mm, preferably 50 to 150 mm, when inflated along the windshield 14. The thickness d of the inflated head-protection airbag 34A indicates a thickness perpendicular to the windshield 14. Other components in FIG. 2 are similar to those in FIG. 1, and the same reference numerals denote the same components. The low-profile airbag 34A has a low capacity so that a gas generator 36 with a fairly low output can be used.

Figure 3:
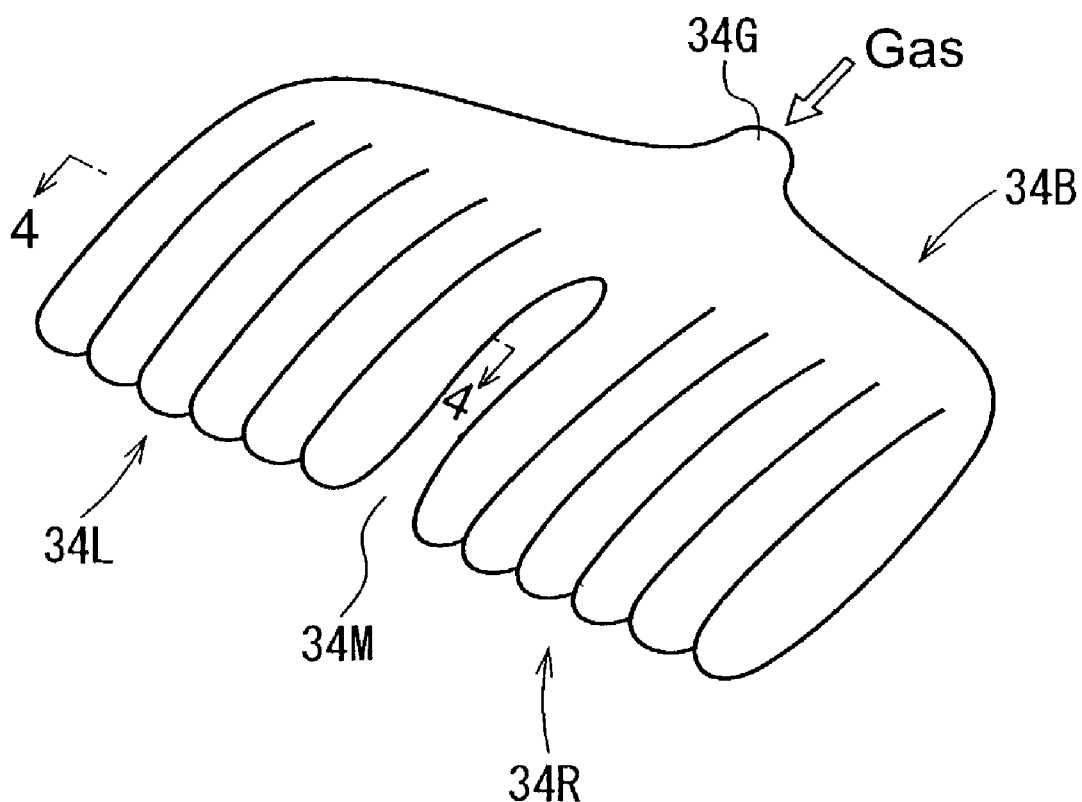
FIG. 3 is a perspective view of an airbag according to the third embodiment of the present invention.
Figure 4:
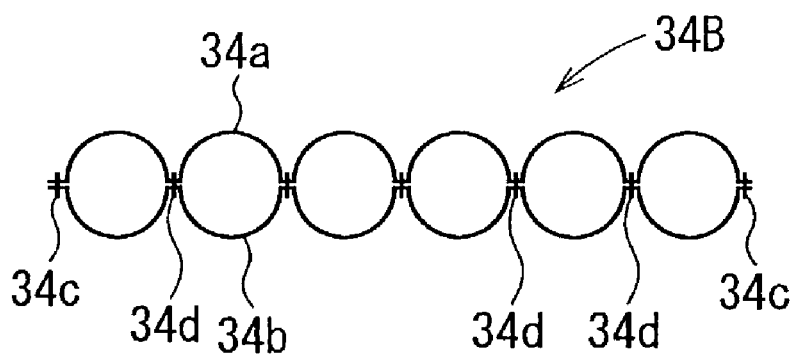
FIG. 4 is a cross sectional view of the airbag taken along line 4—4 in FIG. 3.

As shown in FIGS. 3 and 4, a head-protection airbag 34B having a curtain shape may be used for both a driver seat and a front passenger seat as an alternative of the head-protection airbag 34A shown in FIG. 2. The head-protection airbag 34B has a left half 34L and a right half 34R, and has a spacing 34M between the left half 34L and a right half 34R for accommodating a rearview mirror. The head-protection airbag 34B is arranged at the center of front end of the roof in a lateral direction and above the rearview mirror. A gas generator generates the gas to inflate the head-protection airbag 34B through a gas inlet 34G provided at the center of the head-protection airbag 34B in a lateral direction. Since the spacing 34M is provided, the left half 34L and the right half 34R are inflated downward along the windshield 14 so as to go around the rearview mirror.

As shown in FIG. 4, a front panel 34a and a rear panel 34b are overlapped and peripheries thereof are stitched together with a sewing thread 34c, thereby forming the airbag 34. In the left half 34L and the right half 34R, the front panel 34a and the rear panel 34b are stitched together at a plurality of stitch sections 34d extending upward from a lower end. The head-protection airbag 34B has a small maximum thickness when inflated due to the stitch sections 34d. The head-protection airbags 34A and 34B having a small thickness may have a small vent hole, or no vent hole.

Figure 5:
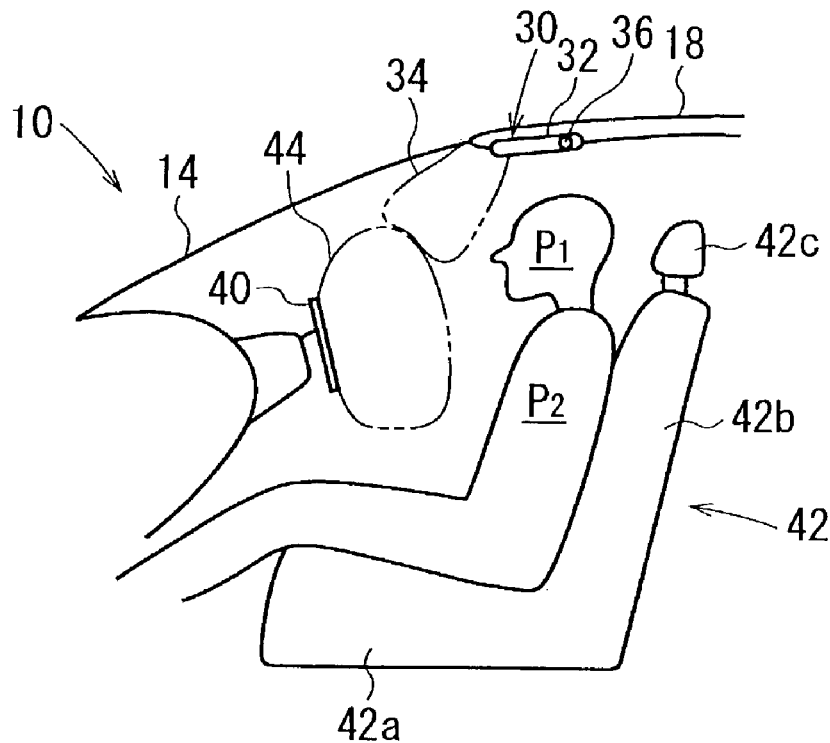
FIG. 5 is a longitudinal sectional view of a vehicle equipped with an occupant protection device according to the fourth embodiment of the present invention.

In the embodiment, the thorax-protection airbag device is for protecting an occupant on a passenger seat. Alternatively, a thorax-protection airbag device may be provided for protecting an occupant on a driver seat as shown in FIG. 5. The thorax-protection airbag device for protecting the occupant on the driver seat is disposed in a steering 40. An airbag (thorax-protection airbag) 44 is inflated over a front area from the thorax P2 of the occupant (adult) P on a driver seat 42 to the lower half of the head. The airbag 44 has a size smaller than that of a general driver-seat airbag device, but it may have the same size. The driver seat 42 includes a seat cushion 42a, a seat back 42b, and a headrest 42c. Other arrangements of FIG. 5 are the same as those in FIG. 1 and the same reference numerals denote the same components.

The head-protection airbag device 30 in FIG. 5 may be replaced with the head-protection airbag device having the head-protection airbag 34B shown in FIGS. 3 and 4.

Figure 6:
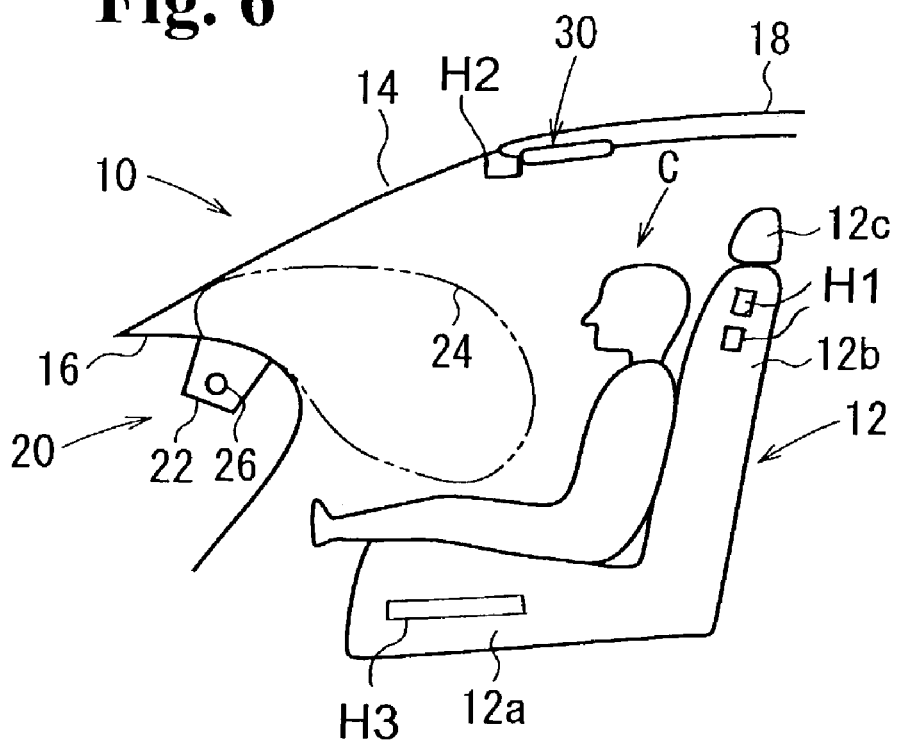
FIG. 6 is a longitudinal sectional view of a vehicle equipped with an occupant protection device according to the fifth embodiment of the present invention.

In the invention, sitting-height detecting means may be provided. When an occupant C such as a child has a sitting height lower than a predetermined value, only the thorax-protection airbag 24 may be inflated as shown in FIG. 6. With such an arrangement, it is necessary to replace only the thorax-protection airbag device with a new one in repairing the vehicle after a crash, thereby reducing a cost of the repair.

The sitting-height detecting means may be a sitting-height detecting device having an imaging device and an image analysis device; a plurality of human-body sensors H1 arranged along the seat back 12b with intervals; an infrared distance-measuring device H2 arranged at the roof for determining a sitting-height of the occupant; or a weight sensor H3 disposed in the seat or at a slide rail of the seat for measuring a weight of the occupant and determining a sitting-height thereof, but it is not limited to those.

In the invention, an impact of the crash and a weight of the occupant may be monitored to control an inner pressure of the airbag upon inflation. Furthermore, a child seat on the seat or a position of the occupant may be monitored to control the activation of the airbag device. The head-protection airbag and the thorax-protection airbag may be inflated at the same timing or one of them is inflated first.

As described above, the occupant protection device of the present invention is capable of inflating the airbag at a sufficiently early stage even with the gas generator having a low output, and protecting the head of an occupant sufficiently.

While the invention has been explained with reference to the specific embodiments of the invention, the explanation is illustrative and the invention is limited only by the appended claims.

What is claimed is:

1. An occupant protection device for protecting an occupant in a vehicle, comprising:
   gas generating means for generating gas,
   an airbag device attached to the gas generating means to be deployed in front of the occupant, said airbag device having a thorax-protection airbag to be deployed in front of a thorax of the occupant and a head-protection airbag to be deployed in front of a head of the occupant above the thorax-protection airbag, and
   detecting means for detecting a sitting height of the occupant so that both the head-protection airbag and the thorax-protection airbag are inflated when the detecting means detects a sitting height higher than a predetermined value, and only the thorax-protection airbag is inflated when the detecting means detects a sitting height lower than the predetermined value.

2. An occupant protection device according to claim 1, wherein said head-protection airbag is disposed at an inner side of a roof of the vehicle to be deployed downward.

3. An occupant protection device according to claim 1, wherein said head-protection airbag has a capacity smaller than that of the thorax-protection airbag.

4. An occupant protection device according to claim 1, wherein said head-protection airbag is formed of a right half bag and a left half bag with a space in between disposed along a windshield.

5. An occupant protection device according to claim 4, wherein said head-protection airbag is disposed above a rearview mirror of the vehicle so that the rearview mirror is accommodated in the space when the head-protection airbag is inflated.

6. An occupant protection device according to claim 1, wherein said gas generating means includes a first gas generator attached to the thorax-protection airbag for inflating the same, and a second gas generator attached to the head-protection airbag for inflating the same.

7. An occupant protection device for protecting an occupant in a vehicle, comprising:
 gas generating means for generating gas, and
 an airbag device attached to the gas generating means to be deployed in front of the occupant, said airbag device having a thorax-protection airbag to be deployed in front of a thorax of the occupant and a head-protection airbag to be deployed in front of a head of the occupant above the thorax-protection airbag, said head-protection airbag having a right half bag, a left half bag and a space in a middle between the right and left half bags, said space extending from a lower portion of the head-protection airbag to separate the right and left half bags so that the right and left half airbags are communicated with each other at an upper side of the right and left half airbags above the space,
 wherein said head-protection airbag further includes a portion for communicating the left half bag and the right half bag above the space, said communicating portion being integrally formed with the left and right half bags.

8. An occupant protection device according to claim 7, wherein said head-protection airbag has a curtain shape used for both a driver seat and a front passenger seat.

9. An occupant protection device according to claim 8, wherein said head-protection airbag is formed of a front panel and a rear panel stitched together at peripheries thereof, and includes stitch sections extending upwardly from the lower portion.

10. An occupant protection device according to claim 7, wherein said gas generating means includes a first gas generator attached to the thorax-protection airbag for inflating the same, and a second gas generator attached to the head-protection airbag for inflating the same.

* * * * *